US012142133B2

(12) United States Patent
Lontka et al.

(10) Patent No.: US 12,142,133 B2
(45) Date of Patent: Nov. 12, 2024

(54) FIRE SAFETY DEVICE ADDRESS AND LOCATION VERIFICATION

(71) Applicant: Siemens Industry, Inc., Alpharetta, GA (US)

(72) Inventors: Karen Lontka, Randolph, NJ (US); Paul Richard Strelecki, Whitehouse Station, NJ (US)

(73) Assignee: SiemensIndustry, Inc., Alpharetta, GA (US)

( * ) Notice: Subject to any disclaimer, the term of this patent is extended or adjusted under 35 U.S.C. 154(b) by 164 days.

(21) Appl. No.: 17/814,744

(22) Filed: Jul. 25, 2022

(65) Prior Publication Data

US 2024/0029544 A1 Jan. 25, 2024

(51) Int. Cl.
*G08B 29/14* (2006.01)

(52) U.S. Cl.
CPC .................................. *G08B 29/145* (2013.01)

(58) Field of Classification Search
CPC ............................ G08B 29/145; G08B 25/003
See application file for complete search history.

(56) References Cited

U.S. PATENT DOCUMENTS 5,691,699 A 11/1997 Vane et al.
6,570,496 B2 5/2003 Britton
7,106,187 B2 9/2006 Penney et al.
7,239,236 B1 7/2007 Britton et al.
8,760,280 B2 6/2014 Piccolo
10,038,501 B2 7/2018 Castor et al.
10,833,765 B2 11/2020 Linnartz et al.
11,232,703 B1 * 1/2022 Wolf .................. H04L 63/0876
11,236,896 B1 * 2/2022 Schiel ....................... F21S 4/28
2005/0128079 A1 * 6/2005 Berezowski ............. G08B 1/08 340/539.22
2006/0139161 A1 * 6/2006 Beghelli ................ H05B 47/19 340/539.1
2008/0084291 A1 * 4/2008 Campion ............ G08B 29/145 340/514

(Continued)

FOREIGN PATENT DOCUMENTS

CA 1116284 A 1/1982
EP 3174224 A1 5/2017
WO 2007009937 A1 1/2007

*Primary Examiner* — Curtis J King

(57) ABSTRACT

A system comprises a plurality of remote addressable devices being individually programmed with configuration data and emitting an output signal modulated to encode the configuration data such that the output signal includes a visual output signal and/or an audio output signal. The system further comprises a mobile device communicating with the plurality of remote addressable devices. The mobile device receives the output signal and demodulates it to extract the configuration data. The system further comprises a central controller communicating with the plurality of remote addressable devices. The mobile device or the central controller identifies a physical location for each remote addressable device, and further determines that the respective remote addressable device is properly configured and operational for communication with the central controller in response to identifying verification that the respective remote addressable device is installed in the physical location associated with the respective remote addressable device within a structure.

24 Claims, 7 Drawing Sheets

(56) References Cited

U.S. PATENT DOCUMENTS

2009/0184816 A1* 7/2009 Hosey .................... G08B 29/14 340/506
2010/0308853 A1* 12/2010 Pullen ................. F04D 15/0088 324/750.05
2015/0077242 A1* 3/2015 Simoncic ............. G08B 29/145 340/514
2015/0097679 A1 4/2015 Andrews et al.
2015/0248832 A1* 9/2015 Piccolo, III .......... G08B 29/145 340/514
2015/0348399 A1* 12/2015 Cree ..................... G06F 3/0488 715/740
2016/0007179 A1* 1/2016 Kim ....................... G08B 7/066 455/404.1
2016/0093203 A1* 3/2016 Hamilton ............... A62C 37/44 709/224
2016/0148498 A1* 5/2016 Ruszala ............... G08B 25/003 340/506
2017/0186297 A1* 6/2017 Brenner ................ H04W 4/021
2017/0193811 A1* 7/2017 Stowell ................ G08B 29/145
2017/0278381 A1* 9/2017 Nalukurthy .......... G08B 29/145
2018/0012173 A1* 1/2018 Leen ...................... G06Q 10/06
2018/0012482 A1* 1/2018 Brown ................... G05B 15/02
2018/0114431 A1* 4/2018 Volam .................... G08B 29/12
2018/0122221 A1* 5/2018 Norton ................... G08B 25/10
2018/0308475 A1* 10/2018 Locke ................... G06F 40/279
2019/0215654 A1 7/2019 Engelen et al.
2020/0066125 A1* 2/2020 Boguslawski ......... G08B 17/10
2020/0394900 A1* 12/2020 Lontka ...................... G06T 7/90
2020/0402381 A1* 12/2020 Nelson ..................... G08B 7/06
2021/0049881 A1* 2/2021 Connell, II ............. H04L 41/06
2021/0060391 A1* 3/2021 Legg .................. A63B 24/0003
2021/0142651 A1* 5/2021 Kybarshi ............. G08B 25/016
2021/0149011 A1* 5/2021 Wetzker .............. G01S 5/02525
2021/0183231 A1* 6/2021 Arellano Valderrama .................. G08B 25/04
2021/0350692 A1* 11/2021 Nalukurthy ........... G06F 16/248
2021/0350693 A1* 11/2021 Nalukurthy ............ G08B 17/00
2022/0254247 A1* 8/2022 Wolf ...................... G08B 29/14

* cited by examiner

FIRE SAFETY DEVICE ADDRESS AND LOCATION VERIFICATION

BACKGROUND

1. Field

Aspects of the present invention generally relate to fire safety networks of addressable devices for commercial and residential buildings and, more particularly, to systems and methods for verification of an addressable device's location upon installation or re-installation.

2. Description of the Related Art

In a fire and/or security system having a central controller (such as a fire panel) and remote addressable devices (such as fire detectors, smoke detectors, and alarm notification appliances) it is necessary to verify that each addressable device is installed in the correct physical location within a structure and is properly configured and operational. However, it is possible that such remote addressable devices that is configured for one physical location (e.g., room 2 floor 1 or zone 1) may be unintentionally installed in a different "wrong" location in the building (e.g., room 10 floor 2 or zone 2). This problem is euphemistically referred to as the "painter problem" where a painter removes all the remote addressable devices from their respective bases, paints the rooms and halls, and then replaces the remote addressable devices in the wrong bases.

By individually activating each remote addressable device its installed location and proper operation can be verified at a central controller such as a fire panel. This verification can be accomplished by two service technicians, one that manually activates the remote addressable device and the other at the central controller or fire panel. Typically, these two technicians will communicate verbally to verify the proper operation and association of an addressable device to the physical location stored in the database of the central controller or fire panel. Alternately, a single technician can perform verification by manually activating a single addressable device and then physical going to the central controller or fire panel location to verify that the correct operation and location was observed for the activated device. Both of these manual device location verification approaches takes significant time and costs for a qualified technician to complete.

SUMMARY

Briefly described, aspects of the present invention relate to a verification system and a method for verifying a remote addressable device's installation location, device specific configuration data and operational status. Presented here are systems and methods to non-ambiguously assure that a respective device is in the correct location (for communication with the proper fire panel or other system controller) without requiring another worker at the fire panel to verify address and location of a particular device and when wireless (cloud) connectivity is not available or prohibited. An existing remote addressable device (that is installed into a base) includes a strobe or visual indicator (e.g., an LED) or audio annunciator. Such a remote addressable device that employs the first embodiment of this invention is configured to include a test/beacon mode and a modulation circuit/module. In one embodiment, the modulation circuit/module comprises modulation logic employed by the remote addressable device's processor when commanded by a central controller or fire panel to enter test/beacon mode. When in the test/beacon mode, the processor retrieves from local memory its configuration data that is unique to the device (such as its assigned address and location), and encodes the unique configuration data in the visual or audio output signal of the remote addressable device. In one embodiment, the visual or audio output signal may modulated by the device processor to encode the unique configuration data when the visual or audio output signal is emitted. A mobile device (e.g., a wireless mobile phone) may include a verification app or logic that is configured to use the remote addressable device's camera or other visual receiver to receive the modulated visual signal from the device and to de-modulate the visual signal to extract the encoded unique configuration data. For devices that do not have a strobe or visual indicator and modulate an audio output signal to encode the unique configuration data, the remote addressable device may include an attenuator to limit the audio level of the audio output signal to limit the number of persons in the area of the remote addressable device under test that might be disturbed by the audio output signal. In this embodiment, the verification app or logic of the mobile device may use the microphone of the mobile device to receive the modulated audio signal from the remote addressable device and demodulate the audio signal to extract the encoded unique configuration data. The mobile device can compare the extracted data emitted by the remote addressable device to a database of respective configuration data for each device is or to be stored in the central controller or fire panel for communication with the addressable devices. Configuration discrepancies or device defects are indicated on the mobile device. In one embodiment, the central controller or fire panel may send a broadcast message to all devices to go to test/beacon mode to "blink"/"pulse out" or modulate the unique data of the respective remote addressable device via its visual indicator LED or its audio annunciator. Alternatively, the remote addressable device may include a microphone or photo diode that can be individually signaled by the mobile device that has a speaker to emit a test/beacon command to the remote addressable device and/or a laser pointer to emit a signal detectable by the device's photo diode to cause the device to enter test/beacon mode as described above. If technician suspect device to device conflict, technician may turn one off via phone transmitting to a device that has a receiving component. Or add lens to phone that narrows field of view to pick up only one of the two devices.

In accordance with one illustrative embodiment of the present invention, a system comprises remote addressable devices. Each remote addressable device of the remote addressable devices being individually programmed with configuration data of a respective addressable device of the remote addressable devices. The respective addressable device of the remote addressable devices emitting an output signal modulated to encode the configuration data associated with the respective addressable device. The output signal includes at least one of a visual output signal or an audio output signal. The system further comprises a mobile device communicating with the remote addressable devices. The mobile device receiving the output signal from the respective addressable device of the remote addressable devices and demodulates the output signal to extract the configuration data associated with the respective addressable device of the remote addressable devices. The system further comprises a central controller communicating with the remote addressable devices. The mobile device or the central controller identifies a physical location for each remote addressable device of the remote addressable devices, and the mobile device or the central controller further determines that the respective remote addressable device is properly configured and operational for communication with the central controller in response to identifying verification that the respective remote addressable device is installed in the physical location associated with the respective remote addressable device within a structure.

In accordance with one illustrative embodiment of the present invention, a method of verifying an address and a physical location of a remote addressable device such as a fire safety device communicating with a central controller such as a fire panel. The method comprises individually programming configuration data of remote addressable devices in each remote addressable device of the remote addressable devices. The method further comprises identifying a physical location for each remote addressable device of the remote addressable devices at a central controller. The method further comprises emitting, by a respective addressable device of the remote addressable devices, an output signal modulated to encode the configuration data associated with the respective addressable device. The output signal includes at least one of a visual output signal or an audio output signal. The method further comprises, in a mobile device, receiving the output signal from the respective addressable device of the remote addressable devices and demodulating the output signal to extract the configuration data associated with the respective addressable device of the remote addressable devices. The method further comprises verifying that the respective addressable device is installed in the physical location associated with the respective addressable device within a structure by determining that the respective remote addressable device is properly configured and operational for communication with the central controller in response to identifying verification that the respective addressable device is installed in the physical location associated with the respective addressable device within the structure.

The above described features and advantages, as well as others, will become more readily apparent to those of ordinary skill in the art by reference to the following detailed description and accompanying drawings. While it would be desirable to provide one or more of these or other advantageous features, the teachings disclosed herein extend to those embodiments which fall within the scope of the appended claims, regardless of whether they accomplish one or more of the above-mentioned advantages.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects.

DETAILED DESCRIPTION

Figure 1:
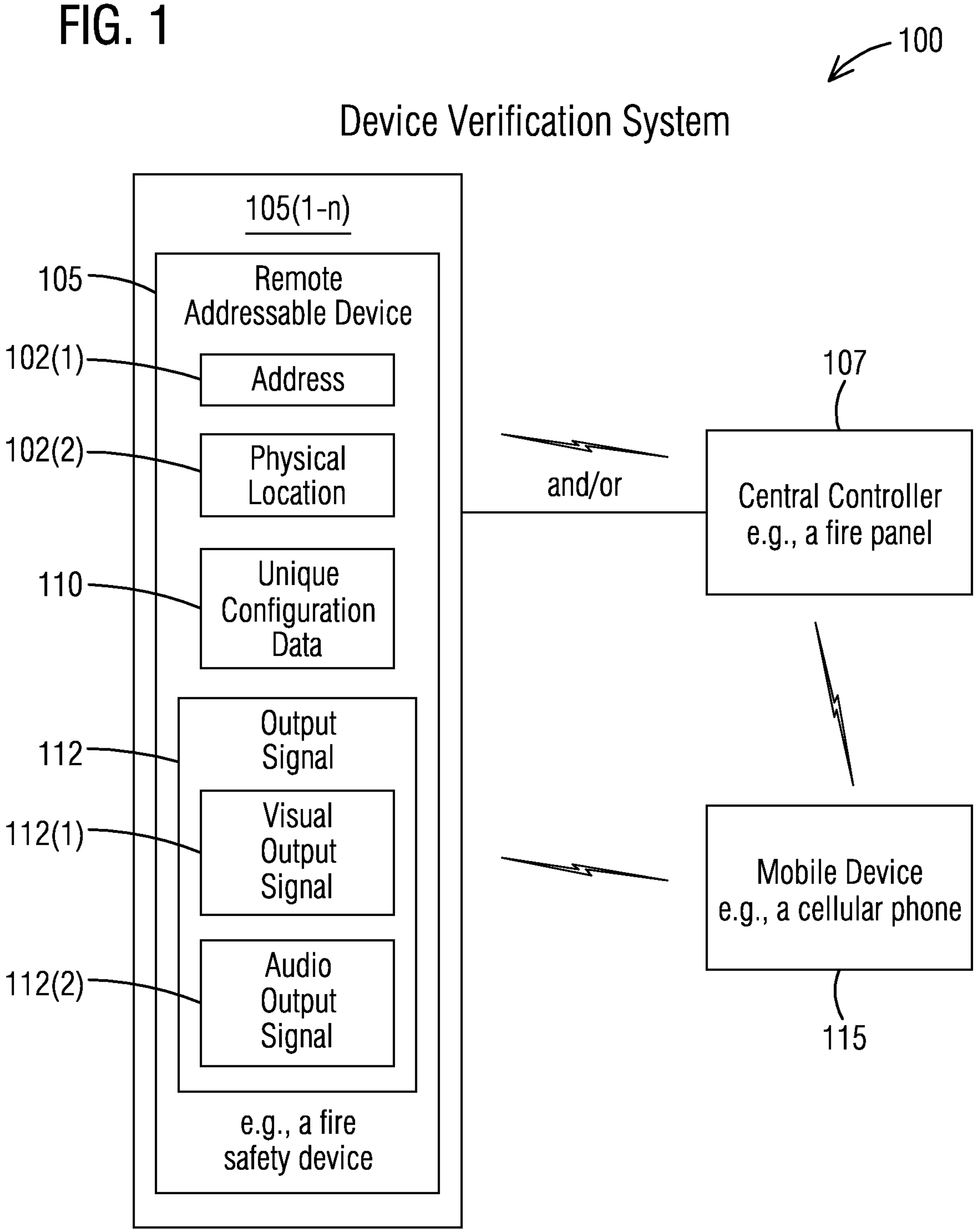
FIG. 1 illustrates a device verification system configured to verify an address and a physical location of a remote addressable device such as a fire safety device communicating with a central controller such as a fire panel in accordance with an example embodiment of the present invention.

Various technologies that pertain to systems and methods that facilitate a device verification mechanism to verify a remote addressable device will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to example non-limiting embodiments.

To facilitate an understanding of embodiments, principles, and features of the present invention, they are explained hereinafter with reference to implementation in illustrative embodiments. In particular, they are described in the context of device verification mechanism for verifying a remote addressable device. Embodiments of the present invention, however, are not limited to use in the described devices or methods.

The components and materials described hereinafter as making up the various embodiments are intended to be illustrative and not restrictive. Many suitable components and materials that would perform the same or a similar function as the materials described herein are intended to be embraced within the scope of embodiments of the present invention.

These and other embodiments of the device verification mechanism according to the present disclosure are described below with reference to FIGS. 1-9 herein. Like reference numerals used in the drawings identify similar or identical elements throughout the several views. The drawings are not necessarily drawn to scale.

Regulations governing fire systems require a visual inspection of all fire and smoke detectors and alarm notification appliances in a building system. When these devices are network addressable by a fire panel or other system controller, there exists the possibility that the unit will be connected to the network of the system but placed in the wrong physical location in the building. This is euphemistically referred to as the "painter problem" where a painter removes all the devices from their respective bases, paints the rooms and halls, and then replaces the devices in the wrong bases. Outlined here are methods to non-ambiguously assure that a respective device is in the correct location (for communication with the proper fire panel or other system controller) without requiring another worker at the fire panel to verify address and location of a particular device and when wireless (cloud) connectivity is not available or prohibited.

Each solution embodiments of this invention allows for verification of a remote addressable device's installation location, device specific configuration data and operational status. Another benefit is that certain of these solutions may need only one technician or self-report to a fire panel without the need for a technician. In the case of a single technician, the solutions eliminate traveling between the addressable device and the location of the central controller or fire panel. The solutions also result in reduced device validation time and associated labor costs.

Consistent with one embodiment of the present invention, FIG. 1 represents a device verification system 100 in accordance with an example embodiment of the present invention. The device verification system 100 is configured to verify an address 102(1) and a physical location 102(2) of a remote addressable device 105 such as a fire safety device communicating with a central controller 107 such as a fire panel in accordance with an example embodiment of the present invention. For device identification, address plates are installed on all addressable components, indicating the address 102(1) of the remote addressable device 105. Labels are clearly readable when the device 105 is mounted at a ceiling and the reader is standing at least 2 or 3 feet away from the device 105. For example, labels are to be of a permanent type, 24 point height, black letter on white tape, with clear laminate overlay. To address the remote addressable device 105 such as a fire alarm device, for a fire alarm system, the numbers on the switches on the detectors and modules represent a number used in identification (addressing). Examples of the physical location 102(2) include (e.g., room 2 floor 1 or zone 1) in the building or (e.g., room 10 floor 2 or zone 2).

The device verification system 100 may be an addressable fire alarm system. An addressable fire alarm system is one in which all fire and smoke detection devices in a system are connected and communicate both with each other and a central control monitoring location. This interconnectivity allows the control personnel to identify the location or "address" where the initial detection occurred. An addressable system sends digital signals in binary code, as opposed to a conventional fire alarm system which operates through electrical currents. Addressable devices do not require a loop. They use communication techniques that allow multiple devices on a given pair of wires to communicate with a central location via some, typically proprietary, communication protocol. In addressable systems, a device can be removed or disabled and it will not affect the other devices in the loop.

For example, an addressable fire alarm system is one in which all fire and smoke detection devices in a system are connected and communicate both with each other and a central control monitoring location. This interconnectivity allows the control personnel to identify the location or "address" where the initial detection occurred. The information directs the emergency response team to pinpoint their efforts immediately to the precise location of the developing problem. Each detection and notification device is connected to each other. Moreover, each device is connected directly to the central addressable fire alarm control panel which is continually sending messages to check on the functionality of each instrument. In response, each element sends back a report that informs the control panel of its current health. If for any reason a device does not respond, the control panel indicates a problem at that particular address. Authorized technicians from the fire alarm maintenance company can immediately proceed to the location, fix or replace the problem device, and the issue is solved. An additional advantage of an addressable fire alarm system is that elements can be programmed to respond in particular ways with specific responses. Systems can be programmed to create a "cause and effect" response. In large buildings with several stories, wings or sections, it is possible to program alarms that are some distance away from the activated alarm to delay sounding to evacuate the building in orderly sequences. Addressable devices do not require a loop. They use communication techniques that allow multiple devices on a given pair of wires to communicate with a central location via some, typically proprietary, communication protocol. Addressable fire alarm systems allow for routine monitoring of the health of each connected device. Alarms will transmit a signal to indicate weakness or malfunction of any component. The source of the problem is identifiable by address and can be serviced easily. The ability to self-diagnose and repair ensures the system will properly function when needed. With independently wired alarms, each device must be checked separately to ensure functionality, and neglect can result in disaster.

The device verification system 100 comprises a plurality of remote addressable devices 105(1-*n*), each remote addressable device of the plurality of remote addressable devices 105(1-*n*) being individually programmed with unique configuration data 110 of a respective addressable device 105 of the plurality of remote addressable devices 105(1-*n*).

The respective addressable device 105 of the plurality of remote addressable devices 105(1-*n*) is configured to emit an output signal 112 modulated to encode the unique configuration data 110 associated with the respective addressable device 105. The output signal 112 includes at least one of a visual output signal 112(1) and/or an audio output signal 112(2).

The device verification system 100 further comprises a mobile device 115 (e.g., any type of portable communication device such as a cellular phone, smartphone, tablet, laptop, and the like) communicating with the plurality of remote addressable devices 105(1-*n*). The mobile device 115 receives the output signal 112 from the respective addressable device 105 of the plurality of remote addressable devices 105(1-*n*) and demodulate the output signal 112 to extract the unique configuration data 110 associated with the respective addressable device 105 of the plurality of remote addressable devices 105(1-*n*).

The device verification system 100 further comprises the central controller 107 communicating with the plurality of remote addressable devices 105(1-*n*) and the mobile device 115. The mobile device 115 or the central controller 107 identifies the physical location 102(2) for each remote addressable device of the plurality of remote addressable devices 105(1-*n*). The mobile device 115 or the central controller 107 further determines that the respective remote addressable device 105 is properly configured and operational for communication with the central controller 107 in response to identifying verification that the respective remote addressable device 105 is installed in the physical location 102(2) associated with the respective remote addressable device 105 within a structure.

The device verification system 100 without requiring another worker at the central controller 107 verifies an address and a physical location of a particular remote addressable device of the plurality of remote addressable devices 105(1-*n*).

Figure 2:
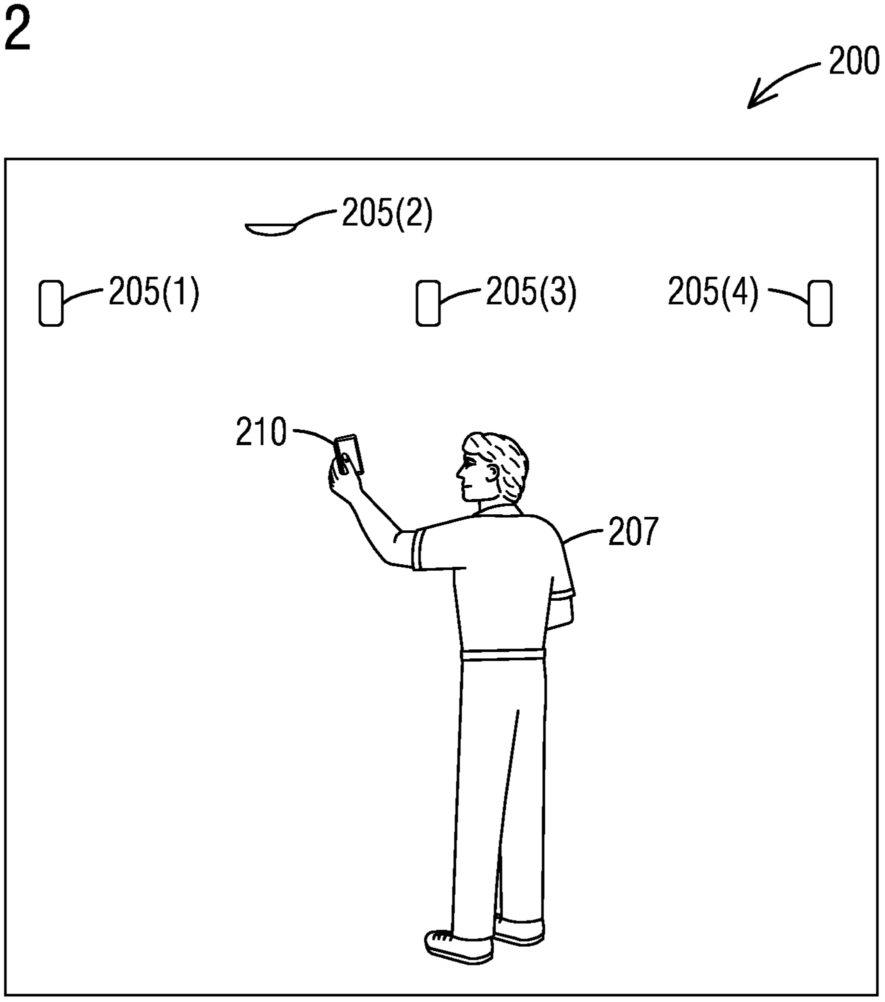
FIG. 2 illustrates an area with several remote addressable devices such that a technician uses a mobile device to detect signals from the remote addressable devices in accordance with an example embodiment of the present invention.

Referring to FIG. 2, it illustrates an area 200 with several remote addressable devices 205(1-4) such that a technician 207 uses a mobile device 210 to detect signals from the remote addressable devices 205(1-4) in accordance with an example embodiment of the present invention. Inside of the area 200 there are several remote addressable devices 205 (1-4) emitting signals. For example, each device 205 emits a coded message containing its address and other information as needed. Since the devices 205(1-4) are on a single control circuit associated with a fire panel, these data bursts are sequenced by a control circuit so as not to overlap. The mobile device 210 can selectively focus on a given device based on a direction in which the mobile device 210 is pointed in, with the ability to emit an optical or audible command to devices equipped to receive such signals. This response from an optical strobe device can contain its candela setting, from a horn its output settings, etc.

Figure 3:
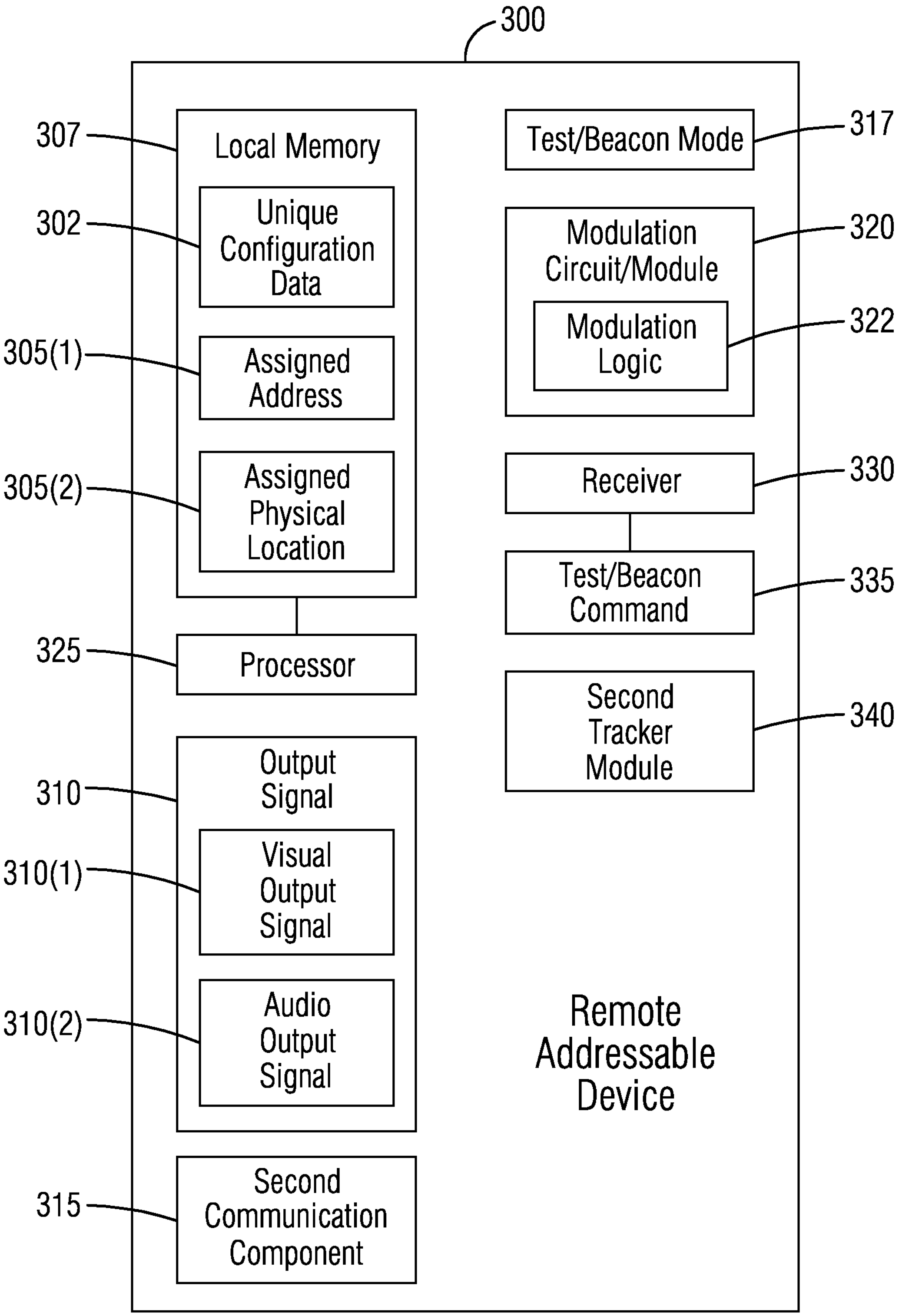
FIG. 3 illustrates a remote addressable device being individually programmed with unique configuration data including its assigned address and its assigned location in a local memory for emitting an output signal modulated to encode the unique configuration data such that the output signal includes at least one of a visual output signal and an audio output signal and further includes a second communication component, a test/beacon mode, a modulation circuit/module that comprises a modulation logic employed by a processor, a receiver capable of detecting a test/beacon command and a second tracker module affixed to the remote addressable device in accordance with an example embodiment of the present invention.

Turning now to FIG. 3, it illustrates a remote addressable device 300 being individually programmed with its unique configuration data 302 including its assigned address 305(1) and its assigned physical location 305(2) in a local memory 307. The remote addressable device 300 is configured to emit an output signal 310 modulated to encode the unique configuration data 302 such that the output signal 310 includes at least one of a visual output signal 310(1) and/or an audio output signal 310(2). The remote addressable device 300 further includes a second communication component 315, a test/beacon mode 317, a modulation circuit/module 320 that comprises a modulation logic 322 employed by a processor 325. The modulation logic 322 is employed by the processor 325 of the existing remote addressable device 300 when commanded by the central controller 107 to enter the test/beacon mode 317.

When in the test/beacon mode 317, the processor 325 retrieves from the local memory 307 its unique configuration data 302 that is unique to the existing remote addressable device 300 including its assigned address 305(1) and its assigned physical location 305(2) and encodes the unique configuration data 302 in the visual output signal 310(1) and/or the audio output signal 310(2) of the existing remote addressable device 300.

The remote addressable device 300 further includes a receiver 330 capable of detecting a test/beacon command 335 and a second tracker module 340 affixed to the remote addressable device 300 in accordance with an example embodiment of the present invention.

The "painter problem" may also be solved by modifying existing bases and existing detector/notification appliances devices as described above. In this embodiment, the mobile device may be a mobile phone that includes a device commissioning/location verification app. During the commissioning process, a Bluetooth enabled or RF beacon enabled tracker module ("Tracker Module") that may be selectively activated such as a "Tile" commercially available from Tile, Inc. is affixed to a base for the addressable fire safety device. The remote addressable device has near field transmitter/receiver with logic akin to the "Tile App" that is commercially available from Tile, Inc. on Google Play and the Apple App Store. As part of the commissioning process, the remote addressable device pairs with the Tracker Module of the base. If a "virgin" addressable device is placed in a base, then that device pairs with the Tracker Module of base and reports its configuration data to the central controller or fire panel. Afterwards, if the same remote addressable device is removed from its paired base, and not replaced in its corresponding base, then the device may report a trouble to the central controller or fire panel and/or enter test/beacon mode to signal its config data and trouble signal to any technician mobile phone with a "commissioning/location verification app" similar to the techniques identified above. In this embodiment, the mobile phone is used to bridge info between the remote addressable device and the Tracker Module or tile of the base so that Tracker/Module or tile affixed to the base has minimum configuration/address id of the remote addressable device.

The "painter problem" may also be solved by modifying existing bases and existing detector/notification appliances devices as described above. After affixing a Tracker Module or "tile" to base another Tracker Module or "tile" is then affixed to the remote addressable device. As part of commissioning of the remote addressable device to the base, the "commissioning/location verification app" on the mobile phone pairs the two tiles as corresponding to each other such that if they are separated, the mobile phone can display current location of both the remote addressable device and its respective base to technician to replace the remote addressable device to its corresponding base.

Figure 4:
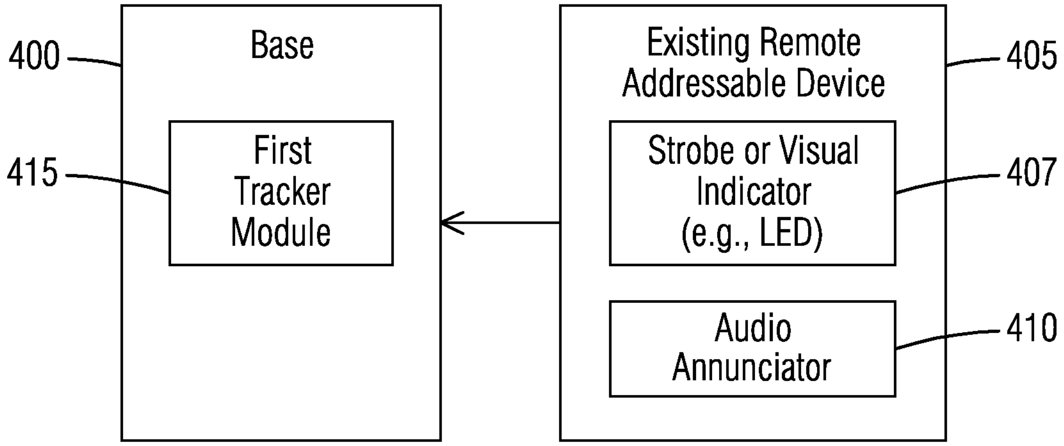
FIG. 4 illustrates a base in which an existing remote addressable device is installed and it includes a strobe or visual indicator (e.g., an LED), an audio annunciator and a first tracker module affixed to the base such that it may be selectively activated in accordance with an example embodiment of the present invention.

FIG. 4 illustrates a base 400 in which an existing remote addressable device 405 is installed and the existing remote addressable device 405 includes a strobe or visual indicator 407 (e.g., an LED) and an audio annunciator 410. The base 400 includes a first tracker module 415 affixed to it such that it may be selectively activated in accordance with an example embodiment of the present invention.

Figure 5:
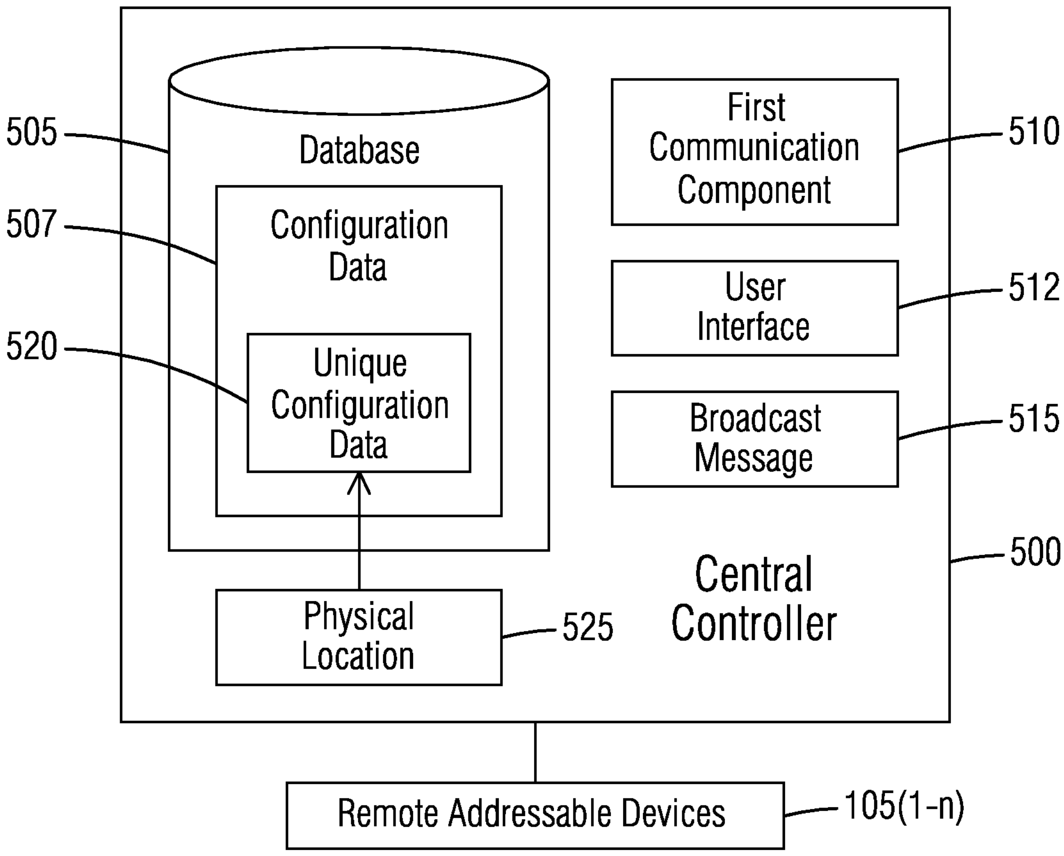
FIG. 5 illustrates a central controller having a database of respective configuration data and a first communication component such that the central controller is configured to send a broadcast message to all remote addressable devices in accordance with an example embodiment of the present invention.

As seen in FIG. 5, it illustrates a central controller 500 having a database 505 of respective configuration data 507, a first communication component 510 and a user interface 512 such that the central controller 500 is configured to send a broadcast message 515 to all the remote addressable devices 105(1-*n*) in accordance with an example embodiment of the present invention. For example, the central controller 500 is configured to send the broadcast message 515 to all the remote addressable devices of the plurality of remote addressable devices 105(1-*n*) to go to a test/beacon mode to "blink"/"pulse out" or modulate unique data of a respective remote addressable device via its visual indicator LED 407 or its audio annunciator 410. Unique configuration data 520 of the respective addressable device 105 and a physical location 525 may be stored at the central controller 500.

For some embodiments, the database 505 of the central controller 500 may be pre-loaded into the mobile device 115, 210 so that this communication is not required when the technician is remote from the central controller 500. For example, the database 505 may be pre-loaded into a memory component of the mobile device 115, 210 either from the central controller 500 or from an external tool, such as a PC-based engineering tool.

Figure 6:
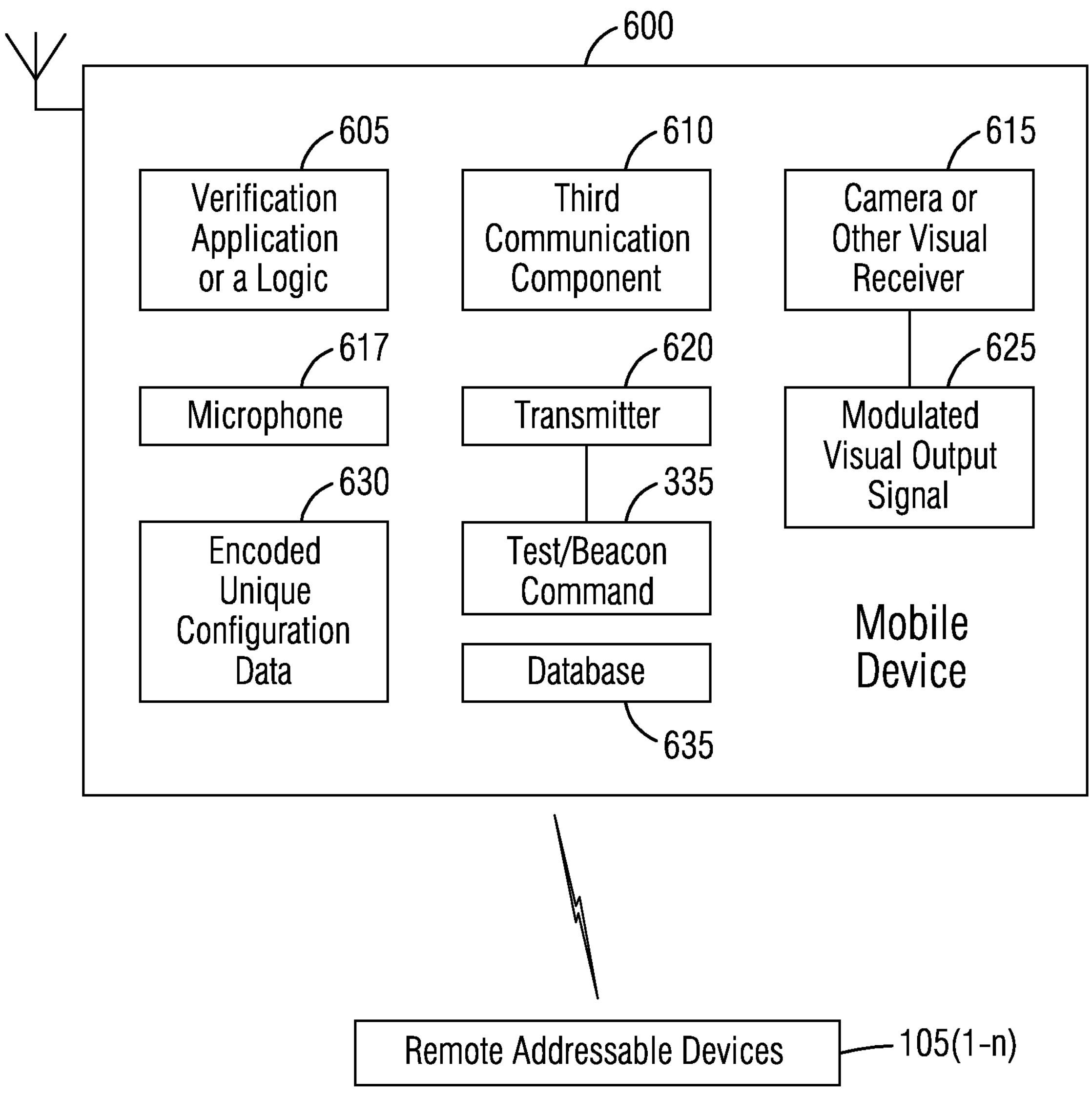
FIG. 6 illustrates a mobile device having a verification application or a logic, a third communication component, a camera or other visual receiver and a microphone such that the mobile device further including a transmitter capable of emitting a test/beacon command in accordance with an example embodiment of the present invention.

As shown in FIG. 6, it illustrates a mobile device 600 having a verification application 605 (e.g., software) or a logic, a third communication component 610, a camera or other visual receiver 615 and a microphone 617. The mobile device 600 further includes a transmitter 620 capable of emitting the test/beacon command 335 in accordance with an example embodiment of the present invention. The mobile device 600 includes the verification application 605 or a logic that is configured to use the mobile device's camera or other visual receiver 615 to receive a modulated visual output signal 625 from a remote addressable device of the plurality of remote addressable devices 105(1-*n*) and to de-modulate the modulated visual output signal to extract encoded unique configuration data 630 associated with the remote addressable device of the plurality of remote addressable devices 105(1-*n*).

The mobile device having the third communication component 610 and the microphone 617 such that the mobile device uses the verification application 615 or a logic to use the mobile device's microphone 617 to receive the modulated audio output signal 625 from a remote addressable device of the plurality of remote addressable devices 105 (1-*n*) and to de-modulate the modulated audio output signal 625 to extract the encoded unique configuration data 630 associated with the remote addressable device of the plurality of remote addressable devices 105(1-*n*).

The mobile device 600 can compare the extracted encoded unique configuration data 630 emitted by the remote addressable device 105 to a database 635 of respective configuration data for each remote addressable device of the plurality of remote addressable devices 105(1-*n*) for identifying and verifying the remote addressable device 105 based on a comparison between a detected address and a desired address and/or a detected location and a desired location such that configuration discrepancies or device defects are indicated on the mobile device 600.

As set forth in FIG. 3, the respective remote addressable device 300 includes the receiver 330 capable of detecting the test/beacon command 335. The receiver 330 may be one of an audio sensor or a light sensor. The mobile device 600 includes the transmitter 620 capable of emitting the test/beacon command 335 to cause the respective remote addressable device 300 to enter in the test/beacon mode 317. The transmitter 620 may be one of an audio source or a light source.

The mobile device 600 includes a device commissioning/location verification app such as the verification application 615 or the logic. During a commissioning process, a Bluetooth enabled or a RF beacon enabled first tracker module 415 may be selectively activated as it is affixed to the base 400 for the remote addressable device of the plurality of remote addressable devices 105(1-*n*). Optionally the second tracker module 340 is affixed to the remote addressable device of the plurality of remote addressable devices 105 (1-*n*).

The mobile device 600 or the central controller 500 identifies the verification by (a) receiving the verification from the mobile device 600, (b) detecting the verification at the user interface 512 of the central controller 500, or (c) determining the verification based on the unique configuration data 520 of the respective addressable device 105 and the physical location 525 stored at the central controller 500.

Figure 7:
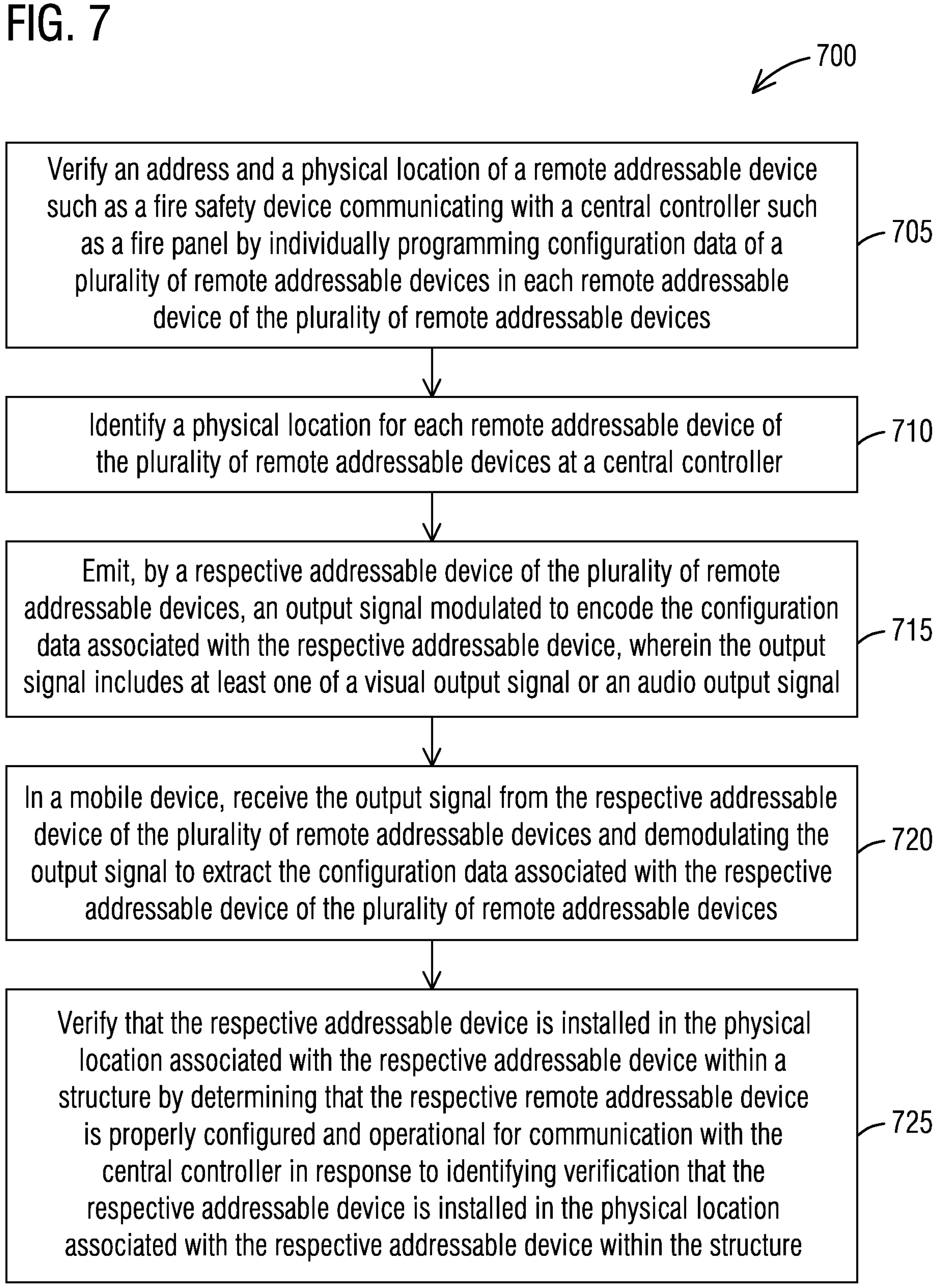
FIG. 7 illustrates a schematic view of a flow chart of a method of verifying an address and a physical location of a remote addressable device such as a fire safety device communicating with a central controller such as a fire panel in accordance with an example embodiment of the present invention.

In FIG. 7, it illustrates a schematic view of a flow chart of a method 700 of verifying an address and a physical location of a remote addressable device such as a fire safety device communicating with a central controller such as a fire panel in accordance with an example embodiment of the present invention. Reference is made to the elements and features described in FIGS. 1-6. It should be appreciated that some steps are not required to be performed in any particular order, and that some steps are optional.

The method 700 comprises a step 705 of individually programming configuration data (110, 302, 507, 520, 630) of a plurality of remote addressable devices 105(1-*n*) in each remote addressable device of the plurality of remote addressable devices. The method 700 further comprises a step 710 of identifying a physical location (102(2), 305(2), 525) for each remote addressable device of the plurality of remote addressable devices 105(1-*n*) at the central controller 500. The method 700 further comprises a step 715 of emitting, by a respective addressable device of the plurality of remote addressable devices 105(1-*n*), an output signal (112, 310) modulated to encode the configuration data (110, 302, 507, 520, 630) associated with the respective addressable device. The output signal (112, 310) includes at least one of a visual output signal or an audio output signal. The method 700 further comprises a step 720 of, in the mobile device 600, receiving the output signal (112, 310) from the respective addressable device of the plurality of remote addressable devices 105(1-*n*) and demodulating the output signal (112, 310) to extract the configuration data (110, 302, 507, 520, 630) associated with the respective addressable device of the plurality of remote addressable devices 105 (1-*n*). The method 700 further comprises a step 725 of verifying that the respective addressable device is installed in the physical location (102(2), 305(2), 525) associated with the respective addressable device within a structure by determining that the respective remote addressable device is properly configured and operational for communication with the central controller 500 in response to identifying verification that the respective addressable device is installed in the physical location (102(2), 305(2), 525) associated with the respective addressable device within the structure.

The method 700 further comprises providing the base 400 in which an existing remote addressable device of the plurality of remote addressable devices 105(1-*n*) is installed and includes a strobe or visual indicator (e.g., an LED) or an audio annunciator. The method 700 further comprises providing the test/beacon mode 320 and a modulation circuit/module in the existing remote addressable device of the plurality of remote addressable devices 105(1-*n*) such that it comprises a modulation logic employed by a processor of the existing remote addressable device when commanded by the central controller 500 to enter the test/beacon mode 320.

The method 700 further comprises, when in the test/beacon mode 320, retrieving from the local memory 307 of the existing remote addressable device of the plurality of remote addressable devices 105(1-*n*) its unique configuration data that is unique to the existing remote addressable device including its assigned address 305(1) and its assigned physical location 305(2). The method 700 further comprises encoding the unique configuration data (110, 302, 507, 520, 630) in the visual output signal or the audio output signal of the existing remote addressable device. The method 700 further comprises verifying an address and a location of a particular remote addressable device of the plurality of remote addressable devices 105(1-*n*) without requiring another worker at the central controller 500.

The method 700 further comprises providing the mobile device 600 with a camera or other visual receiver. The method 700 further comprises providing the mobile device 600 with a microphone. The method 700 further comprises providing the remote addressable device of the plurality of remote addressable devices 105(1-*n*) with a visual device and/or an audio device.

The method 700 further comprises causing the central controller 500 to send a broadcast message 515 to all remote addressable devices of the plurality of remote addressable devices 105(1-*n*) to go to the test/beacon mode to "blink"/ "pulse out" or modulate unique data of a respective remote addressable device via its visual indicator LED or its audio annunciator.

During normal operations, the device 105 polling LED blinks only when that device is uniquely receiving its address from the respective fire panel. This behavior can be augmented to have the light emitted by a polling LED encoded with the address and other information of the respective device. Under normal system supervision, the LED blink occurs at long intervals approximately equal to the number of devices on the circuit times 250 ms. On a fully utilized circuit of a fire panel, the LED would blink only once in approximately one minute. If the mobile device has the capability to focus on a single device, then a testing operation is initiated where the panel places the devices in a given circuit into a mode where the LED of each device in network communication with the circuit will emit its data on each data polling frame, every 250 ms. This latter technique improves efficiency but either method can be used for the purpose of gathering data.

The mobile device may receive and decode data from emitted LED light from devices that are modulated at pre-determined freq/encode key. With decoded data, the mobile device has program logic to: (1) determine device address from decoded data; (2) prompt user for current location; (3) check address and location look-up table to determine if address from device corresponds to associated pre=determined location. If not, the device flags all devices not associated with user identified location (e.g., in wrong room).

Remote Addressable devices 105(1-*n*) have a polling LED as a "Sign of Life" indicator. Typically, this LED performs a dim, quick flash that simply indicates that the device has heard from and spoken to the fire panel. If the current drive to this LED is increased, it can then be modulated by the device processor to encode data detectable by an external device but is not human observable. This data can be the physical device serial number, or the address assigned by the fire panel to this remote addressable device.

Figure 8:
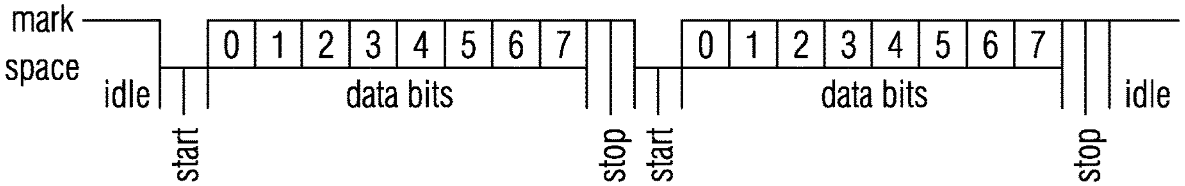
FIG. 8 illustrates modulation as a simple asynchronous data sequence in accordance with an example embodiment of the present invention.

The modulation can be a simple asynchronous data sequence as shown in FIG. 8; however, this type of modulation suffers from duty cycle issues. For example, during a series of all zeros the LED would only be on for one cell, the start bit. If the series were all ones, it would be on for eight cell periods giving an integrated illumination difference of 1 to 8, from barely visible to over bright. For this reason, this simple method is not desirable for the proposed technique.

Figure 9:
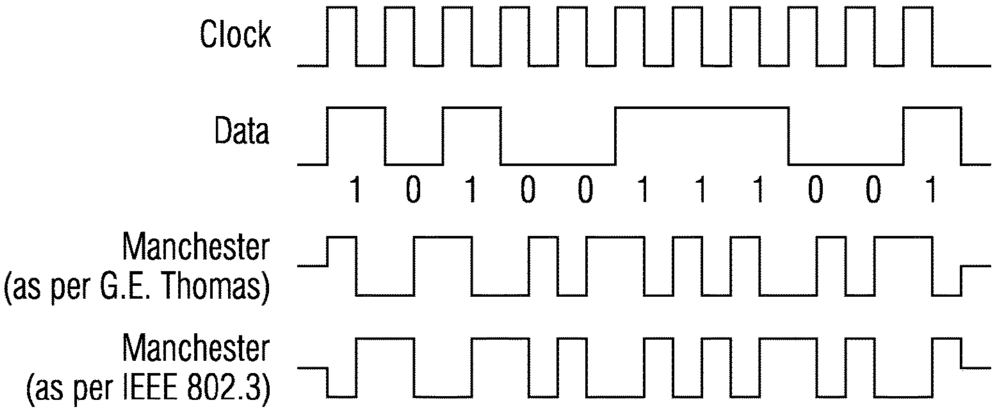
FIG. 9 illustrates Manchester encoding in accordance with an example embodiment of the present invention.

Manchester encoding is shown in FIG. 9. A Manchester encoded data stream or a more complex FM/FSK modulation on a high frequency carrier has a duty cycle that is very close to 50% at all times. While a slight flicker could be perceived it would not be as egregious as asynchronous signals. This, combined with a short duration in background identification mode, will allow the devices to constantly emit their address as a beacon via their respective polling LED.

Because the duration and brightness of the LED might become intrusive to occupants in the environment, this mode of operation may be optional in some embodiments. The mode is commanded from the fire panel to start at the being of an inspection session and continues until the end of the session.

Notification Appliances offer other signal sources such as horns, speakers, or LED strobe lights. The same forms of signal encoding, as previously discussed, can be used for these sources but power and control interfaces may limit the amount of data that can be transferred.

Two-way communication as used in at least one embodiment is described next in this paragraph. Notification Appliances, as envisioned, have microphones and photo diodes that are primarily used for self-test functions. These sensors, however, can also be used to receive signals from an external device, allowing commands to be received by the Notification Appliance (NA). The signal can originate from a mobile device such as a smartphone, dedicated device or a hybrid of the two.

ID on command as used in at least one embodiment is described next in this paragraph. If the device can receive a command, the identification Sequence rather than be continuous, can respond to a query from a mobile device. This will reduce the annoyance of a continuous audible sound or bright flash.

For audible communication the existing speaker within a smartphone may prove to be too weak, depending on the acoustics of the location. Also a standalone smartphone may not be able to focus on a single device.

While audio and visual communications are described here a range of one or more other types of communications are also contemplated by the present invention. For example, other forms of communications may be implemented based on one or more features presented above without deviating from the spirit of the present invention.

The techniques described herein can be particularly useful for fire safety systems installed in a building system. While particular embodiments are described in terms of the fire safety systems, the techniques described herein are not limited to such systems but can also be used with other device verification systems.

While embodiments of the present invention have been disclosed in example forms, it will be apparent to those skilled in the art that many modifications, additions, and deletions can be made therein without departing from the spirit and scope of the invention and its equivalents, as set forth in the following claims.

Embodiments and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure embodiments in detail. It should be understood, however, that the detailed description and the specific examples, while indicating preferred embodiments, are given by way of illustration only and not by way of limitation. Various substitutions, modifications, additions and/or rearrangements within the spirit and/or scope of the underlying inventive concept will become apparent to those skilled in the art from this disclosure.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited to only those elements but may include other elements not expressly listed or inherent to such process, article, or apparatus.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms.

In the foregoing specification, the invention has been described with reference to specific embodiments. However, one of ordinary skill in the art appreciates that various modifications and changes can be made without departing from the scope of the invention. Accordingly, the specification and figures are to be regarded in an illustrative rather than a restrictive sense, and all such modifications are intended to be included within the scope of invention.

Although the invention has been described with respect to specific embodiments thereof, these embodiments are merely illustrative, and not restrictive of the invention. The description herein of illustrated embodiments of the invention is not intended to be exhaustive or to limit the invention to the precise forms disclosed herein (and in particular, the inclusion of any particular embodiment, feature or function is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Respective appearances of the phrases "in one embodiment," "in an embodiment," or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

It will also be appreciated that one or more of the elements depicted in the drawings/figures can also be implemented in a more separated or integrated manner, or even removed or rendered as inoperable in certain cases, as is useful in accordance with a particular application.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. A system comprising:

a plurality of remote addressable devices, each remote addressable device of the plurality of remote addressable devices being individually programmed with configuration data of a respective addressable device of the plurality of remote addressable devices, wherein the respective addressable device of the plurality of remote addressable devices emitting an output signal modulated to encode the configuration data associated with the respective addressable device, wherein the output signal includes at least one of a visual output signal or an audio output signal;

a mobile device communicating with the plurality of remote addressable devices, the mobile device includes a verification application or a logic that is configured to use a visual or audio receiver to receive the modulated output signal from the respective addressable device of the plurality of remote addressable devices and demodulate the modulated output signal to extract the encoded configuration data associated with the respective addressable device of the plurality of remote addressable devices; and a central controller communicating with the plurality of remote addressable devices, the mobile device or the central controller identifies a physical location for each remote addressable device of the plurality of remote addressable devices, and the mobile device or the central controller further determines that the respective remote addressable device is properly configured and operational for communication with the central controller in response to identifying verification that the respective remote addressable device is installed in the physical location associated with the respective remote addressable device within a structure.

2. The system of claim 1, further comprising:

a base in which an existing remote addressable device of the plurality of remote addressable devices is installed and includes a strobe or visual indicator (e.g., an LED) or an audio annunciator.

3. The system of claim 2, wherein the existing remote addressable device of the plurality of remote addressable devices includes a test/beacon mode and a modulation circuit/module that comprises a modulation logic employed by a processor of the existing remote addressable device when commanded by the central controller to enter the test/beacon mode.

4. The system of claim 3, wherein when in the test/beacon mode, the processor retrieves from a local memory its unique configuration data that is unique to the existing remote addressable device including its assigned address and its assigned location and encodes the unique configuration data in a visual output signal or an audio output signal of the existing remote addressable device, wherein the system without requiring another worker at the central controller to verify an address and a location of a particular remote addressable device of the plurality of remote addressable devices.

5. The system of claim 4, wherein the central controller having a first communication component, the plurality of remote addressable devices each including the processor, the local memory, a second communication component, and the mobile device having a third communication component and a camera or other visual receiver, wherein the verification application or the logic is configured to use the mobile device's camera or other visual receiver to receive the modulated visual output signal from the remote addressable device of the plurality of remote addressable devices and to de-modulate the modulated visual output signal to extract encoded configuration data associated with the remote addressable device of the plurality of remote addressable devices.

6. The system of claim 4, wherein the mobile device having a third communication component and a microphone, wherein the verification application or the logic is configured to use the mobile device's microphone to receive the modulated audio output signal from the remote addressable device of the plurality of remote addressable devices and to de-modulate the modulated audio output signal to extract the encoded configuration data associated with the remote addressable device of the plurality of remote addressable devices.

7. The system of claim 5, wherein the mobile device can compare the extracted encoded unique configuration data emitted by the remote addressable device to a database of respective configuration data for each remote addressable device of the plurality of remote addressable devices for identifying and verifying the remote addressable device based on a comparison between a detected address and a desired address and/or a detected location and a desired location such that configuration discrepancies or device defects are indicated on the mobile device, wherein the central controller is configured to send a broadcast message to all remote addressable devices of the plurality of remote addressable devices to go to a test/beacon mode to "blink"/"pulse out" or modulate unique data of a respective remote addressable device via its visual indicator LED or its audio annunciator.

8. The system of claim 7, wherein:

the respective remote addressable device includes a receiver capable of detecting a test/beacon command, the receiver being one of an audio sensor or a light sensor; and the mobile device including a transmitter capable of emitting the test/beacon command to cause the respective remote addressable device to enter in the test/beacon mode, the transmitter being one of an audio source or a light source.

9. The system of claim 7, wherein the mobile device includes a device commissioning/location verification app such that during a commissioning process, a Bluetooth enabled or a RF beacon enabled first tracker module may be selectively activated as it is affixed to a base for the remote addressable device of the plurality of remote addressable devices, wherein a second tracker module is affixed to the remote addressable device of the plurality of remote addressable devices.

10. The system of claim 1, wherein the mobile device or the central controller identifies the verification by (a) receiving the verification from the mobile device, (b) detecting the verification at a user interface of the central controller, or (c) determining the verification based on the configuration data of the respective addressable device and the physical location stored at the central controller.

11. A method comprising:

individually programming configuration data of a plurality of remote addressable devices in each remote addressable device of the plurality of remote addressable devices;

identifying a physical location for each remote addressable device of the plurality of remote addressable devices at a central controller;

emitting, by a respective addressable device of the plurality of remote addressable devices, an output signal modulated to encode the configuration data associated with the respective addressable device, wherein the output signal includes at least one of a visual output signal or an audio output signal;

in a mobile device, receiving by a visual or audio receiver the modulated output signal from the respective addressable device of the plurality of remote addressable devices and demodulating the modulated output signal to extract the encoded configuration data associated with the respective addressable device of the plurality of remote addressable devices; and verifying that the respective addressable device is installed in the physical location associated with the respective addressable device within a structure by determining that the respective remote addressable device is properly configured and operational for communication with the central controller in response to identifying verification that the respective addressable device is installed in the physical location associated with the respective addressable device within the structure.

12. The method of claim 11, further comprising:

providing a base in which an existing remote addressable device of the plurality of remote addressable devices is installed and includes a strobe or visual indicator (e.g., an LED) or an audio annunciator.

13. The method of claim 12, further comprising:

providing a test/beacon mode and a modulation circuit/module in the existing remote addressable device of the plurality of remote addressable devices such that it comprises a modulation logic employed by a processor of the existing remote addressable device when commanded by the central controller to enter the test/beacon mode;

when in the test/beacon mode, retrieving from a local memory of the existing remote addressable device of the plurality of remote addressable devices its unique configuration data that is unique to the existing remote addressable device including its assigned address and its assigned location;

encoding the unique configuration data in the visual output signal or the audio output signal of the existing remote addressable device;

verifying an address and a location of a particular remote addressable device of the plurality of remote addressable devices without requiring another worker at the central controller;

providing the mobile device with a camera or other visual receiver; and providing the mobile device with a microphone.

14. The method of claim 13, further comprising:

providing the remote addressable device of the plurality of remote addressable devices with a visual device and/or an audio device.

15. The method of claim 13, further comprising:

causing the central controller to send a broadcast message to all remote addressable devices of the plurality of remote addressable devices to go to the test/beacon mode to “blink”/“pulse out” or modulate unique data of a respective remote addressable device via its visual indicator LED or its audio annunciator.

16. The method of claim 13, wherein:

the respective remote addressable device includes a receiver capable of detecting a test/beacon command, the receiver being one of an audio sensor or a light sensor; and the mobile device including a transmitter capable of emitting the test/beacon command to cause the respective remote addressable device to enter in the test/beacon mode, the transmitter being one of an audio source or a light source.

17. The method of claim 11, further comprising:

providing a device commissioning/location verification app such that during a commissioning process, a Bluetooth enabled or a RF beacon enabled first tracker module may be selectively activated as it is affixed to a base for the remote addressable device of the plurality of remote addressable devices, wherein a second tracker module is affixed to the remote addressable device of the plurality of remote addressable devices.

18. The method of claim 11, wherein the mobile device or the central controller identifies the verification by (a) receiving the verification from the mobile device, (b) detecting the verification at a user interface of the central controller, or (c) determining the verification based on the configuration data of the respective addressable device and the physical location stored at the central controller.

19. A system comprising:

a plurality of remote addressable devices, each remote addressable device of the plurality of remote addressable devices being individually programmed with configuration data of a respective addressable device of the plurality of remote addressable devices, wherein the respective addressable device of the plurality of remote addressable devices emitting an output signal modulated to encode the configuration data associated with the respective addressable device, wherein the output signal includes at least one of a visual output signal or an audio output signal;

a mobile device communicating with the plurality of remote addressable devices, the mobile device receiving the output signal from the respective addressable device of the plurality of remote addressable devices and demodulates the output signal to extract the configuration data associated with the respective addressable device of the plurality of remote addressable devices; and a central controller communicating with the plurality of remote addressable devices, the mobile device or the central controller identifies a physical location for each remote addressable device of the plurality of remote addressable devices, and the mobile device or the central controller further determines that the respective remote addressable device is properly configured and operational for communication with the central controller in response to identifying verification that the respective remote addressable device is installed in the physical location associated with the respective remote addressable device within a structure, wherein a central controller having a first communication component, the plurality of remote addressable devices each including a processor, a local memory, a second communication component, and the mobile device having a third communication component and a camera or other visual receiver, wherein the mobile device includes a verification application or a logic that is configured to use the mobile device’s camera or other visual receiver to receive a modulated visual output signal from a remote addressable device of the plurality of remote addressable devices and to de-modulate the modulated visual output signal to extract encoded unique configuration data associated with the remote addressable device of the plurality of remote addressable devices.

20. The system of claim 19, wherein the mobile device having the third communication component as a microphone.

21. The system of claim 19, wherein the mobile device can compare the extracted encoded unique configuration data emitted by the remote addressable device to a database of respective configuration data for each remote addressable device of the plurality of remote addressable devices for identifying and verifying the remote addressable device based on a comparison between a detected address and a desired address and/or a detected location and a desired location such that configuration discrepancies or device defects are indicated on the mobile device.

22. The system of claim 19, wherein the central controller is configured to send a broadcast message to all remote addressable devices of the plurality of remote addressable devices to go to a test/beacon mode to “blink”/“pulse out” or modulate unique data of a respective remote addressable device via its visual indicator LED or its audio annunciator.

23. The system of claim 19, wherein:

the respective remote addressable device includes a receiver capable of detecting a test/beacon command, the receiver being one of an audio sensor or a light sensor; and the mobile device including a transmitter capable of emitting the test/beacon command to cause the respective remote addressable device to enter in the test/beacon mode, the transmitter being one of an audio source or a light source.

24. The system of claim 19, wherein the mobile device includes a device commissioning/location verification app such that during a commissioning process, a Bluetooth enabled or a RF beacon enabled first tracker module may be selectively activated as it is affixed to a base for the remote addressable device of the plurality of remote addressable devices, wherein a second tracker module is affixed to the remote addressable device of the plurality of remote addressable devices.

* * * * *